US008749668B2

(12) United States Patent
Hsu

(10) Patent No.: US 8,749,668 B2
(45) Date of Patent: Jun. 10, 2014

(54) ADAPTIVE PIXEL COMPENSATION METHOD

(75) Inventor: Wei Hsu, Taoyuan County (TW)

(73) Assignee: NOVATEK Microelectronics Corp., Hsinchu Science Park, Hsin-Chu (TW)

( * ) Notice: Subject to any disclaimer, the term of this patent is extended or adjusted under 35 U.S.C. 154(b) by 158 days.

(21) Appl. No.: 13/350,837

(22) Filed: Jan. 16, 2012

(65) Prior Publication Data

US 2013/0050528 A1    Feb. 28, 2013

(30) Foreign Application Priority Data

Aug. 30, 2011    (TW) .............................. 100131074 A

(51) Int. Cl.
*H04N 9/64*      (2006.01)
*H04N 5/335*      (2011.01)

(52) U.S. Cl.
USPC ............................................ 348/241; 348/272

(58) Field of Classification Search
USPC .......................... 348/241–257, 234, 272, 277
See application file for complete search history.

(56) References Cited

U.S. PATENT DOCUMENTS

| 3,971,065 | A | 7/1976 | Bayer | |
|---|---|---|---|---|
| 7,088,392 | B2* | 8/2006 | Kakarala et al. | 348/272 |
| 8,134,616 | B2* | 3/2012 | Shimoozono et al. | 348/246 |
| 8,446,493 | B2* | 5/2013 | Utsugi | 348/237 |
| 2003/0052981 | A1 | 3/2003 | Kakarala | |
| 2003/0067546 | A1* | 4/2003 | Asano | 348/226.1 |
| 2005/0212933 | A1* | 9/2005 | Miyanohara | 348/272 |
| 2006/0268134 | A1* | 11/2006 | Chen et al. | 348/241 |
| 2007/0165116 | A1 | 7/2007 | Hung | |
| 2009/0174797 | A1* | 7/2009 | Hu et al. | 348/247 |
| 2010/0177203 | A1* | 7/2010 | Lin | 348/222.1 |

FOREIGN PATENT DOCUMENTS

| TW | I260918 | 8/2006 |
|---|---|---|
| TW | I324011 | 4/2010 |

OTHER PUBLICATIONS

Li, IEEE Trans on Consumer Electronics, CMOS Sensor Cross-Talk Compensation for Digital Cameras, May 2002, vol. 48, No. 2, pp. 292-297.
Weerasinghe, IEEE Proceding, Method of Color Interpolation in a Single Sensor Color Camera Using Green Channel Separation, 2002, pp. 3233-3236.

* cited by examiner

*Primary Examiner* — Tuan Ho
*Assistant Examiner* — Selam Gebriel
(74) *Attorney, Agent, or Firm* — Winston Hsu; Scott Margo

(57) ABSTRACT

An adaptive pixel compensation method for an image processing apparatus includes receiving an image array data, calculating an average of luminance values of a first plurality of green sub-pixels surrounding the green sub-pixel as a first average value, calculating an average of luminance values of a second plurality of green sub-pixels surrounding the green sub-pixel as a second average value, calculating an absolute luminance difference value of the first average value and the second average value, calculating an average luminance gradient value of the green sub-pixel and a third plurality of green sub-pixels surrounding the green sub-pixel, and determining whether to compensate the green sub-pixel according to a luminance value of the green sub-pixel, the absolute luminance difference value and the average luminance gradient value.

20 Claims, 2 Drawing Sheets

ADAPTIVE PIXEL COMPENSATION METHOD

BACKGROUND OF THE INVENTION

1. Field of the Invention

The present invention relates to an adaptive pixel compensation method, and more particularly, to an adaptive pixel compensation method based on difference and variation of luminance property.

2. Description of the Prior Art

Image sensing elements such as CMOS image sensors (CIS) and charge-coupled devices (CCD) have been widely applied in various consumer electronic products such as digital camera, personal digital assistants (PDAs) and smart mobile communication devices, etc. Currently, an image sensing element usually performs image capturing in conjunction with Bayer pattern color-filters. Since the human eye is able to discern a wider range of details for green color visual information, the three primary color pixels (red, blue, and green) in a pixel array arranged according to Bayer patterns are not evenly distributed, but with green pixels having a dominant proportion.

Please refer to FIG. 1, which is a schematic diagram of an image array data 10 arranged in the Bayer pattern. As shown in FIG. 1, the image array data 10 is a 5×5 Bayer pattern image array data. In FIG. 1, R represents red pixels (i.e. pixels with red filter), G represents green pixels (i.e. pixels with green filter), and B represents blue pixels (i.e. pixels with blue filter). Each odd-numbered row in the image array data 10 is composed of alternatively arranged green sub-pixels and blue sub-pixels, known as a Gb pixel row. Each even-numbered row in the image array data 10 is composed of alternatively arranged green sub-pixels and red sub-pixels, known as a Gr pixel row. Generally, green sub-pixels on the same-type pixel row would exhibit similar physical properties, whereas green sub-pixels on different-type pixel rows often exhibit detrimental effects such as green unbalance, due to different levels of interference from surrounding pixels, which can cause problems such as latticed images, false colors, or blurry edges in subsequent image reconstruction.

SUMMARY OF THE INVENTION

Therefore, an adaptive pixel compensation method is disclosed in the disclosure.

An adaptive pixel compensation method for an image processing device is disclosed. The adaptive pixel compensation method can include receiving an image array data, the image array data comprising a plurality of alternately arranged first-type pixel rows and second-type pixel rows, each of the first-type pixel rows comprising a plurality of green sub-pixels and a plurality of red sub-pixels but no blue sub-pixels, and each of the second-type pixel rows comprising a plurality of green sub-pixels and a plurality of blue sub-pixels but no red sub-pixels, calculating an average luminance value of a first plurality of green sub-pixels surrounding a green sub-pixel in the image array data as a first average value, wherein the first plurality of green sub-pixels are located on at least one first-type pixel row, calculating an average luminance value of a second plurality of green sub-pixels surrounding the green sub-pixel in the image array data as a second average value, wherein the second plurality of green sub-pixels are located on at least one second-type pixel row, calculating an absolute difference value between the first average value and the second average value, calculating an average luminance gradient value between the green sub-pixel and a surrounding third plurality of green sub-pixels, and deciding whether to compensate the green sub-pixel according to a luminance value, the absolute difference value, and the average luminance gradient value of the green sub-pixel.

Another adaptive pixel compensation method for an image processing device is disclosed. The adaptive pixel compensation method can include receiving an image array data, the image array data comprising a plurality of alternately arranged first-type pixel rows and second-type pixel rows, each of the first-type pixel rows comprising a plurality of green sub-pixels and a plurality of red sub-pixels but no blue sub-pixels, and each of the second-type pixel rows comprising a plurality of green sub-pixels and a plurality of blue sub-pixels but no red sub-pixels, comparing differences in luminance properties of a first plurality of green sub-pixels and a second plurality of green sub-pixels surrounding a green sub-pixel in the image array data, wherein the first plurality of green sub-pixels are located on at least one first-type pixel row, and the second plurality of green sub-pixels are located on at least one second-type pixel row, deciding whether to compensate the green sub-pixel according to the comparison result.

Further another adaptive pixel compensation method, comprising: calculating an average luminance value of a first plurality of green sub-pixels surrounding a green sub-pixel in an image array data as a first average value, wherein the first plurality of green sub-pixels are located on at least one pixel row each of which consists of green sub-pixels and red sub-pixels; calculating an average luminance value of a second plurality of green sub-pixels surrounding the green sub-pixel in the image array data as a second average value, wherein the second plurality of green sub-pixels are located on at least one row each of which consists green sub-pixels and blue sub-pixels; calculating an absolute difference value between the first average value and the second average value; calculating an average luminance gradient value between the green sub-pixel and a surrounding third plurality of green sub-pixels; and deciding whether to compensate the green sub-pixel according to a luminance value, the absolute difference value, and the average luminance gradient value of the green sub-pixel.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
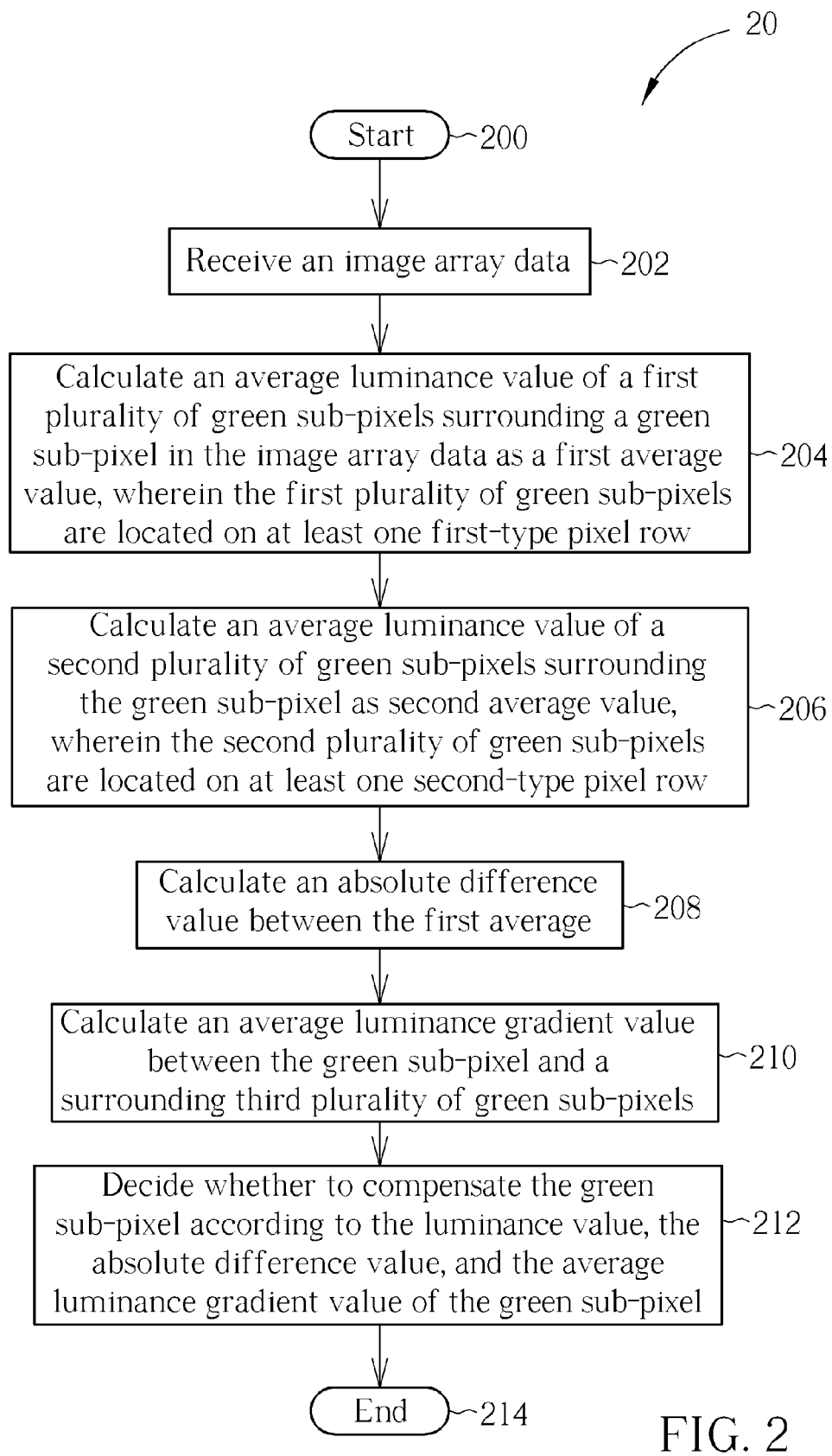
FIG. 2 is a schematic diagram of an adaptive pixel compensation process according to an embodiment of the invention.

Please refer to FIG. 2, which is a schematic diagram of an adaptive pixel compensation process 20 according to an embodiment of the invention. The adaptive pixel compensation process 20 is used in an image processing device, and includes the following steps:

Step 200: Start.
Step 202: Receive an image array data.
Step 204: Calculate an average luminance value of a first plurality of green sub-pixels surrounding a green sub-pixel in the image array data as a first average value, wherein the first plurality of green sub-pixels are located on at least one first-type pixel row.

Step 206: Calculate an average luminance value of a second plurality of green sub-pixels surrounding the green sub-pixel as second average value, wherein the second plurality of green sub-pixels are located on at least one second-type pixel row.

Step 208: Calculate an absolute difference value between the first average value and the second average value.

Step 210: Calculate an average luminance gradient value between the green sub-pixel and a surrounding third plurality of green sub-pixels.

Step 212: Decide whether to compensate the green sub-pixel according to the luminance value, the absolute difference value, and the average luminance gradient value of the green sub-pixel.

Step 214: End.

Figure 1:
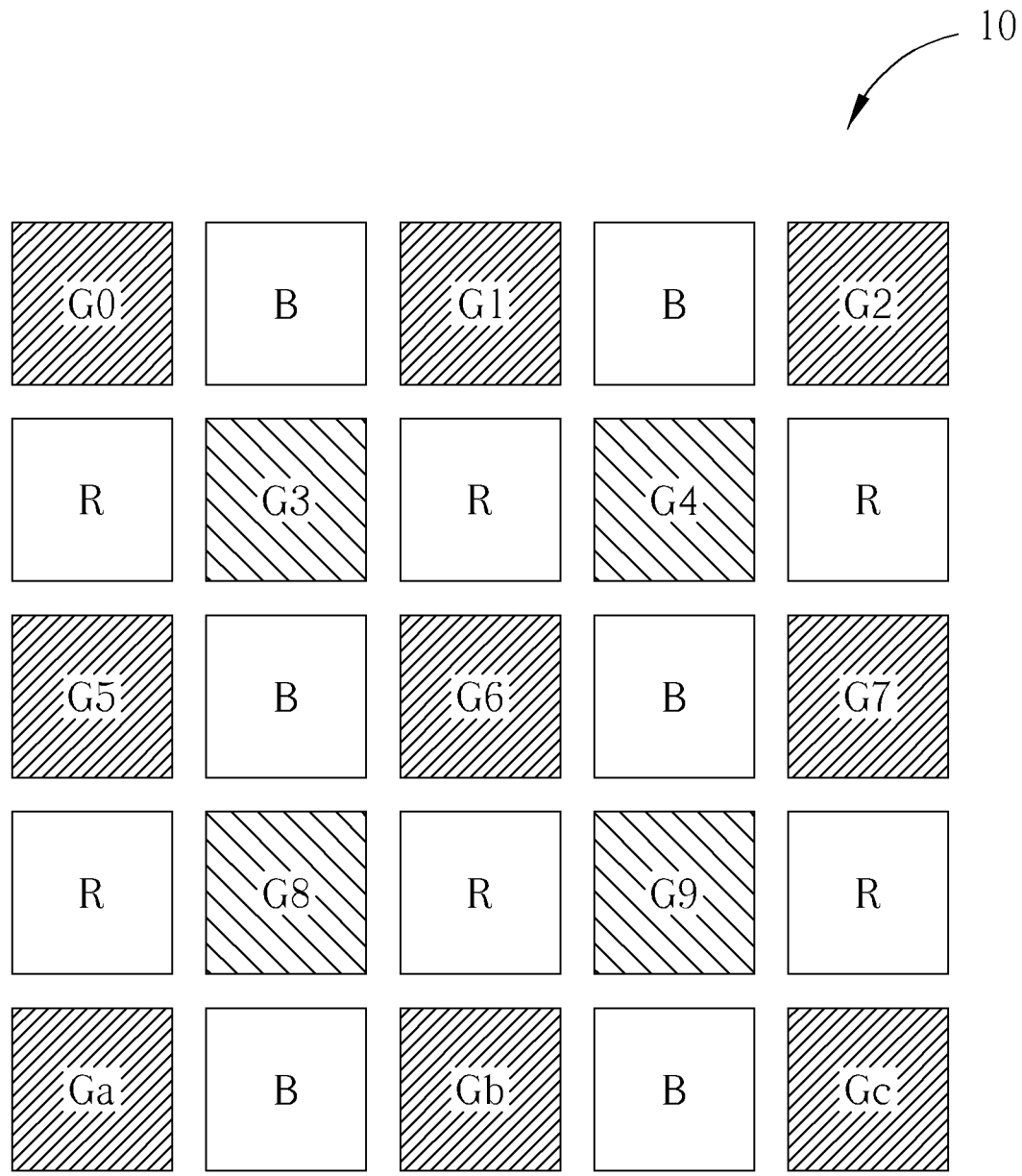
FIG. 1 is a schematic diagram of an image array data arranged in a Bayer pattern.

The following describes each of the above-mentioned steps in detail. Firstly, in Step 202, an image array data can be received from an image sensing element after the image sensing element in the image processing device captures the image array data, wherein the image array data can include an alternately arranged plurality of first-type pixel rows and second-type pixel rows. For example, odd-numbered rows in the image array data maybe the first-type pixel rows, and even-numbered rows may be the second-type pixel rows, or vice versa. Moreover, the first and second-type pixel rows may have different pixel compositions, respectively. For example, each of the first-type pixel rows may include a plurality of green sub-pixels and red sub-pixels, but no blue sub-pixels; each of the second-type pixel rows may include a plurality of green sub-pixels and blue sub-pixels, but no red sub-pixels. Moreover, the first and second-type pixel rows may have other different pixel arrangements. For example, as shown in FIG. 1, the image array data 10 is a 5×5 Bayer Pattern image array, wherein even-numbered rows in the image array data 10 may be Gr pixel rows, and each Gr pixel row may be primary composed of alternately arranged green and red sub-pixels, but no blue sub-pixels. Odd-numbered rows in the array image 10 may be Gb pixel rows, and each Gb pixel row maybe primarily composed of alternately arranged green and blue sub-pixels, but no red sub-pixels. Note that, in the embodiment, explanation for the adaptive pixel compensation process 20 is made along the direction of rows, but it can be made along the direction of columns. The difference lies only in the reference direction without leading to any substantial difference.

In Step 204, a green sub-pixel is selected from the image array data as a reference center, and an average luminance value of the surrounding first plurality of green sub-pixels is calculated to obtain the first average value, wherein green sub-pixels surrounding the selected green sub-pixel and located on at least one first-type pixel row can serve as the first plurality of green sub-pixels. In other words, all of the first green sub-pixels located within a specific region surrounding the selected green sub-pixel and located on the first-type pixel row are identified, and the average luminance value of all of the first green sub-pixels (i.e. the first average value) is calculated. Note that, the aforementioned green sub-pixel selected as a reference center may be an arbitrary green sub-pixel in the image array data. In other words, the pixel compensation process can be performed by using the adaptive pixel compensation process 20 for each green sub-pixel in the image array data. Hereinafter, the green sub-pixel selected as the reference center will be referred to as a reference green sub-pixel.

Similarly, in Step 206, using the selected reference green sub-pixel as center, an average luminance value of the surrounding second plurality of green sub-pixels is calculated to obtain the second average value, wherein green sub-pixels surrounding the selected reference green sub-pixel and located on at least one of the second-type pixel rows can serve as the second plurality of green sub-pixels. In other words, all of the second green sub-pixels surrounding the reference green sub-pixel which are located on the second-type pixel rows are identified to calculate the average value of the luminance values of all of the second green sub-pixels (i.e. the second average value).

Note that, in a different embodiment for Steps 204 and 206, with the selected reference green sub-pixel as a center, an average luminance value of only a part of its surrounding first plurality of green sub-pixels may be calculated as the first average value. More specifically, certain first green sub-pixels surrounding the reference green sub-pixel that are located on the first-type pixel rows may be picked out, and then an average value of luminance values of these first green sub-pixels is calculated. Similarly, with the reference green sub-pixel as the center, an average luminance value of a part of its surrounding second plurality of green sub-pixels may be calculated as the second average value.

With the image array data 10 shown in FIG. 1 as an example, primarily two types of pixel arrangements are present in the pixel rows of the image array data 10. Firstly, a Gr pixel row is composed of alternately arranged green and red sub-pixels; secondly, a Gb pixel row is composed of alternately arranged green and blue sub-pixels. Furthermore, the pixel rows Gr and Gb are alternately disposed. In such a case, with a certain green sub-pixel in the image array data 10 as the center, the green sub-pixels on concentric circles are usually pixels of a same-type pixel row, respectively. Therefore, in the embodiment, it is possible to calculate an average luminance value of all green sub-pixels on a closest ring surrounding the reference green sub-pixel and located on the first-type pixel rows as the first average value. Alternatively, the first average value may also be calculated as an average luminance value of all green sub-pixels on a number of closest rings (i.e. a first specific number of rings) surrounding the reference green sub-pixel that are located on the first-type pixel rows. Similarly, it is possible to calculate an average luminance value of all green sub-pixels on a closest ring surrounding the reference green sub-pixel that are located on the second-type pixel rows as the second average value. Alternatively, the second average value may also be calculated as an average luminance value of all green sub-pixels on a number of closest rings (i.e. a second specific number of rings) surrounding the reference green sub-pixel that are located on the second-type pixel rows.

Next, in Step 208, the difference between the first average value and second average value can be estimated. Preferably, an absolute difference value between the first average value and second average value is calculated. In other words, an absolute value of a difference between the first and the second average values is calculated, to obtain the absolute difference value between the first and the second average values. For example, if a green sub-pixel G6 shown in FIG. 1 is selected as the reference green sub-pixel, then according to Steps 204 and 206, it is possible to calculate an average luminance value Avg_A for pixels on the closest ring that are located on the Gb pixel rows, i.e. pixels (G0, G1, G2, G5, G7, Ga, Gb, Gc); it is also possible to calculate an average luminance value Avg_B for pixels on the closest ring that are located on the Gr pixel rows, i.e. pixels (G3, G4, G8, G9). Next, according to Step

208, an absolute difference value AvgDiff between the average luminance values Avg_A and Avg_B may be calculated.

Since latticed image edges often occur at positions with subtle differences between the Gb pixels and the Gr pixels, it is possible to calculate luminance property differences between pixels on the first and the second-type pixel rows via Steps 204 to 208. In other words, the calculation result in Step 208 can indicate luminance property differences between the first and the second plurality of green sub-pixels surrounding the reference green sub-pixel in the image array data, and provide a basis for determining whether or not pixel compensation should be performed on the reference green sub-pixel. In another embodiment, any value which can reflect luminance property differences between the first and the second plurality of green sub-pixels is available.

In Step 210, an average luminance gradient value is calculated for the selected reference green sub-pixel and its surrounding third plurality of green sub-pixels. Simply, an average value of all gradient values of the reference green sub-pixel and its surrounding third plurality of green sub-pixels is calculated. The third plurality of green sub-pixels may include all of the green sub-pixels located on at least two nearest rings surrounding the reference green sub-pixel, apart from the green pixels on each of its four corners. Alternatively, the third plurality of sub-pixels maybe at least one adjacent green sub-pixels of the reference green sub-pixel, e.g. green sub-pixels located on each of its eight neighboring grid positions. More specifically, an average value is calculated for a plurality of gradient values of the reference green sub-pixel and at least one its neighboring third plurality of eight green sub-pixels along different directions. For example, it is possible to calculate a plurality of gradient values of the reference green sub-pixel and its surrounding third plurality of green sub-pixels along a column direction and a row direction, respectively, and then calculate an average value of all of the calculated gradient values, to obtain the aforementioned average luminance gradient value.

For example, with the image array data 10 shown in FIG. 1 as an example, and following Step 210, it is possible to calculate a vertical luminance gradient value dV along a column (vertical) direction, and a horizontal luminance gradient value dH along a row (horizontal) direction, to obtain an average luminance gradient value dVH, which may be expressed as the following:

$$dV=|G1-G6|+|Gb-G6|+|G3-G8|+|G4-G9|$$

$$dH=|G5-G6|+|G7-G6|+|G3-G4|+|G8-G9|$$

$$dVH=(dV+dH)/8$$

In an image, a gradient value can often represent characteristics of an object along its border. The gradient value would be relatively greater where there are larger pixel variations along a certain direction. Additionally, an average gradient value can accurately reflect subtle variations in details of the image. As such, using Step 210 to calculate the average gradient value of neighboring pixels can allow image details and edge information to be preserved, as well as reflect a rate of change for green sub-pixel luminance values over the pixel array, so as to determine whether or not to perform subsequent compensation on the reference green sub-pixel accordingly. In another embodiment, any value which can reflect a rate of change for green sub-pixel luminance values over the pixel array is available.

Finally, in Step 212, it is possible to decide whether compensation is needed for the reference green sub-pixel according to a luminance value of the selected reference green sub-pixel, the absolute difference value calculated in Step 208, and the average luminance gradient value obtained in Step 210. For example, if the absolute difference value calculated in Step 208 is smaller than a product of the reference green sub-pixel and a luminance control parameter, and the average luminance gradient value obtained in Step 210 is smaller than a product of the reference green sub-pixel and a gradient control parameter, a compensation value can be determined for compensating the reference green sub-pixel and used as a new value of the reference green sub-pixel.

Therefore, the above-mentioned adaptive pixel compensation process can be used to decide whether to perform corresponding pixel compensation on the selected green sub-pixel according to luminance property differences of surrounding green sub-pixels and luminance gradient variations of the green sub-pixel in the image array data. As such, it is possible to perform pixel compensation without affecting original image content, while preserving original details of the image and prevent generation of false colors on image edges.

Furthermore, to prevent image blurring, the aforementioned pixel compensation process may utilize minimum error compensation when calculating compensation values. For example, a first compensation value may be decided according to a plurality of first absolute difference values between the first average value and luminance values of the first plurality of green sub-pixels obtained in Step 204. Similarly, a second compensation value may be decided according to a plurality of second absolute difference values between the second average value and luminance values of the second plurality of green sub-pixels obtained in Step 206. An average value of a difference of the first compensation value and the second compensation value is taken as the compensation value. Finally, the compensation value can be added to the luminance value of the reference green sub-pixel to obtain a new luminance value for the reference green sub-pixel.

The aforementioned first compensation value may be a sum of a minimum value of the plurality of first absolute difference values and the first average value obtained in Step 204. Similarly, the aforementioned second compensation value may be a sum of a minimum value of the plurality of second absolute difference values and the second average value. For example, with the image array data 10 shown in FIG. 1 as an example, the first compensation value Delta_A and the second compensation value Delta_B maybe obtained after deciding to compensate the reference green sub-pixel according to the selected luminance values of the reference green sub-pixel, the calculated absolute difference value, and the average luminance gradient value in Step 212. The first compensation value Delta_A and the second compensation value Delta_B may be expressed as the following:

Delta_A=MinAbs{(G0-Avg_A), (G1-Avg_A), (G2-Avg_A), (G5-Avg_A), (G6-Avg_A), (G7-Avg_A), (Ga-Avg_A), (Gb-Avg_A), (Gc-Avg_A)}+Avg_A; and Delta_B=MinAbs{(G3-Avg_B), (G4-Avg_B), (G8-Avg_B), (G9-Avg_B)}+Avg_B In such a case, when it is decided that pixel compensation should be performed on the reference green sub-pixel, the compensation value maybe taken as the average value of the difference of the first compensation value and the second compensation value. The new value G6' of the reference green sub-pixel is then the compensation value added to the luminance value of the reference green sub-pixel, and may be expressed as the following:

$$G6'=G6+(Delta\_A-Delta\_B)/2$$

In summary, the above-mentioned adaptive pixel compensation method performs corresponding green pixel compensation according to luminance property differences and luminance variations of different types of surrounding green sub-pixels in the image array data. As such, pixel compensation may be performed while preserving image details and not affecting image content (i.e. no image blurring). Thus, optimal image quality may be obtained by eliminating latticed images, false colors, or blurry edges in subsequent image reconstruction.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An adaptive pixel compensation method for an image processing device, the adaptive pixel compensation method comprising:
   receiving an image array data, the image array data comprising a plurality of alternately arranged first-type pixel rows and second-type pixel rows, each of the first-type pixel rows comprising a plurality of green sub-pixels and a plurality of red sub-pixels but no blue sub-pixels, and each of the second-type pixel rows comprising a plurality of green sub-pixels and a plurality of blue sub-pixels but no red sub-pixels;
   calculating an average luminance value of a first plurality of green sub-pixels surrounding a green sub-pixel in the image array data as a first average value, wherein the first plurality of green sub-pixels are located on at least one first-type pixel row;
   calculating an average luminance value of a second plurality of green sub-pixels surrounding the green sub-pixel in the image array data as a second average value, wherein the second plurality of green sub-pixels are located on at least one second-type pixel row;
   calculating an absolute difference value between the first average value and the second average value;
   calculating an average luminance gradient value between the green sub-pixel and a surrounding third plurality of green sub-pixels; and
   deciding whether to compensate the green sub-pixel according to a luminance value, the absolute difference value, and the average luminance gradient value of the green sub-pixel.

2. The adaptive pixel compensation method of claim 1, wherein the first plurality of green sub-pixels comprises all green sub-pixels surrounding the green sub-pixel and located on the nearest at least one ring on the first-type pixel row.

3. The adaptive pixel compensation method of claim 1, wherein the second plurality of green sub-pixels comprises all green sub-pixels surrounding the green sub-pixel and located on the nearest at least one ring on the second-type pixel row.

4. The adaptive pixel compensation method of claim 1, wherein the average luminance gradient value is an average value of a plurality of gradient values between the green sub-pixel and the third plurality of green sub-pixels along a plurality of directions.

5. The adaptive pixel compensation method of claim 4, wherein the plurality of directions comprise a column direction and a row direction.

6. The adaptive pixel compensation method of claim 1, wherein the third plurality of green sub-pixels comprise all green sub-pixels surrounding the green sub-pixel located on the nearest at least two rings, other than on each of four corners.

7. The adaptive pixel compensation method of claim 1 further comprising:
   deciding a first compensation value according to a plurality of first absolute difference values between the first average value and luminance values of each of the first plurality of green sub-pixels when deciding to compensate the green sub-pixel;
   deciding a second compensation value according to a plurality of second absolute difference values between the second average value and luminance values of each of the second plurality of green sub-pixels; and
   compensating the green sub-pixel according to the first compensation value and the second compensation value.

8. The adaptive pixel compensation method of claim 7, wherein the first compensation value is a sum of a minimum value of the plurality of first absolute difference values and the first average value.

9. The adaptive pixel compensation method of claim 7, wherein the second compensation value is a sum of a minimum value of the plurality of second absolute difference values and the second average value.

10. The adaptive pixel compensation method of claim 1, wherein the step of deciding whether to compensate the green sub-pixel according to the luminance value, the absolute difference value, and the average luminance gradient value of the green sub-pixel comprises:
    deciding to compensate the green sub-pixel if the absolute difference value is smaller than a product of the luminance value and a luminance control parameter, and the average luminance gradient value is smaller than a product of the luminance value and a gradient control parameter, else deciding not to compensate the green sub-pixel.

11. An adaptive pixel compensation method for an image processing device, the adaptive pixel compensation method comprising:
    receiving an image array data, the image array data comprising a plurality of alternately arranged first-type pixel rows and second-type pixel rows, each of the first-type pixel rows comprising a plurality of green sub-pixels and a plurality of red sub-pixels but no blue sub-pixels, and each of the second-type pixel rows comprising a plurality of green sub-pixels and a plurality of blue sub-pixels but no red sub-pixels;
    comparing luminance property differences between a first plurality of green sub-pixels surrounding a green sub-pixel in the image array data and a second plurality of green sub-pixels surrounding the green sub-pixel in the image array data, wherein the first plurality of green sub-pixels are located on at least one first-type pixel row, and the second plurality of green sub-pixels are located on at least one second-type pixel row;
    deciding whether to compensate the green sub-pixel according to the comparison result.

12. The adaptive pixel compensation method of claim 11, wherein the step of comparing luminance property differences between the first plurality of green sub-pixels surrounding the green sub-pixel in the image array data and the second plurality of green sub-pixels surrounding the green sub-pixel in the image array data comprises:
    calculating an average luminance value of the first plurality of green sub-pixels as a first average value;
    calculating an average luminance value of the second plurality of green sub-pixels as a second average value; and
    calculating an absolute difference value between the first average value and the second average value.

13. The adaptive pixel compensation method of claim 11 further comprising calculating a rate of change of luminance values between the green sub-pixel and a surrounding third plurality of green sub-pixels on the pixel array to further decide whether to compensate the green sub-pixel according to the rate of change.

14. The adaptive pixel compensation method of claim 13, wherein the step of calculating the rate of change of luminance values between the green sub-pixel and the surrounding third plurality of green sub-pixels on the pixel array comprises calculating an average luminance gradient value between the green sub-pixel and the third plurality of green sub-pixels.

15. An adaptive pixel compensation method, comprising:
   calculating an average luminance value of a first plurality of green sub-pixels surrounding a green sub-pixel in an image array data as a first average value, wherein the first plurality of green sub-pixels are located on at least one pixel row each of which consists of green sub-pixels and red sub-pixels;
   calculating an average luminance value of a second plurality of green sub-pixels surrounding the green sub-pixel in the image array data as a second average value, wherein the second plurality of green sub-pixels are located on at least one row each of which consists green sub-pixels and blue sub-pixels;
   calculating an absolute difference value between the first average value and the second average value;
   calculating an average luminance gradient value between the green sub-pixel and a surrounding third plurality of green sub-pixels; and
   deciding whether to compensate the green sub-pixel according to a luminance value, the absolute difference value, and the average luminance gradient value of the green sub-pixel.

16. The adaptive pixel compensation method of claim 15 further comprising:
   deciding a first compensation value according to a plurality of first absolute difference values between the first average value and luminance values of each of the first plurality of green sub-pixels when deciding to compensate the green sub-pixel;
   deciding a second compensation value according to a plurality of second absolute difference values between the second average value and luminance values of each of the second plurality of green sub-pixels; and
   compensating the green sub-pixel according to the first compensation value and the second compensation value.

17. The adaptive pixel compensation method of claim 16, wherein the first compensation value is a sum of a minimum value of the plurality of first absolute difference values and the first average value.

18. The adaptive pixel compensation method of claim 16, wherein the second compensation value is a sum of a minimum value of the plurality of second absolute difference values and the second average value.

19. The adaptive pixel compensation method of claim 15, wherein the step of deciding whether to compensate the green sub-pixel according to the luminance value, the absolute difference value, and the average luminance gradient value of the green sub-pixel comprises: deciding to compensate the green sub-pixel if the absolute difference value is smaller than a product of the luminance value and a luminance control parameter, and the average luminance gradient value is smaller than a product of the luminance value and a gradient control parameter.

20. The adaptive pixel compensation method of claim 15, wherein the step of deciding whether to compensate the green sub-pixel according to the luminance value, the absolute difference value, and the average luminance gradient value of the green sub-pixel comprises: deciding not to compensate the green sub-pixel if the absolute difference value is not smaller than a product of the luminance value and a luminance control parameter, and the average luminance gradient value is smaller than a product of the luminance value and a gradient control parameter.

\* \* \* \* \*